United States Patent [19]

Ewing

[11] 4,003,670
[45] Jan. 18, 1977

[54] BLOCK BORING TOOL

[76] Inventor: H. Richard Ewing, Rte. 4, Box 31A, Titusville, Pa. 16354

[22] Filed: Oct. 24, 1975

[21] Appl. No.: 625,580

[52] U.S. Cl. .............................. 408/185; 408/240
[51] Int. Cl.² ...................................... B23B 29/034
[58] Field of Search ......... 408/238, 239, 240, 186, 408/181, 179, 185, 147, 153, 197; 29/96

[56] References Cited

UNITED STATES PATENTS 3,060,771  10/1962  Johnson ............................. 408/240
3,354,527  11/1967  Carlstedt et al. ....................... 29/96

*Primary Examiner*—Gil Weidenfeld

[57] ABSTRACT

A holder for a cutting tool bit in the form of an elongated block and an elongated tang is disclosed. The tang has provision for supporting a throw-away tip. The tang is generally rectangular in cross section and has an edge defining an acute angle and a cylindrical clamping member which has a flat wedge-like edge on one side. The clamping member is threaded to receive a headed screw that extends through said body, urging the surface into clamped relation with the edge of the tang. A jack screw is extended through the tang and engages the bottom of the blind hole for moving the tang in precise increments relative to the block.

12 Claims, 5 Drawing Figures

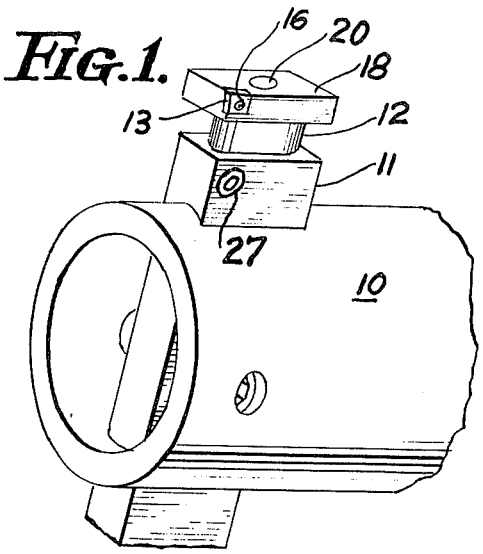
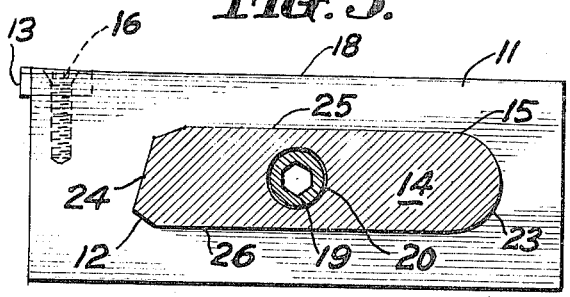
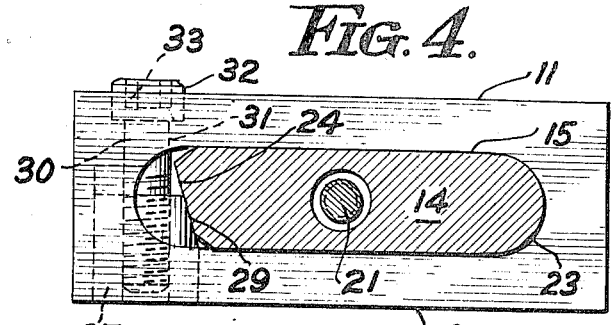
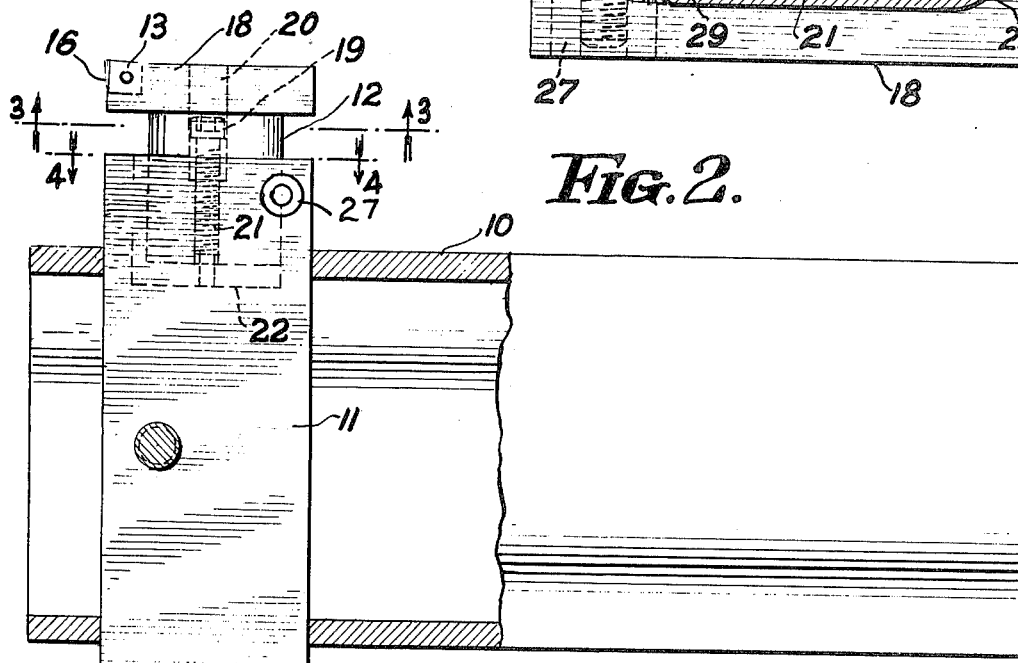
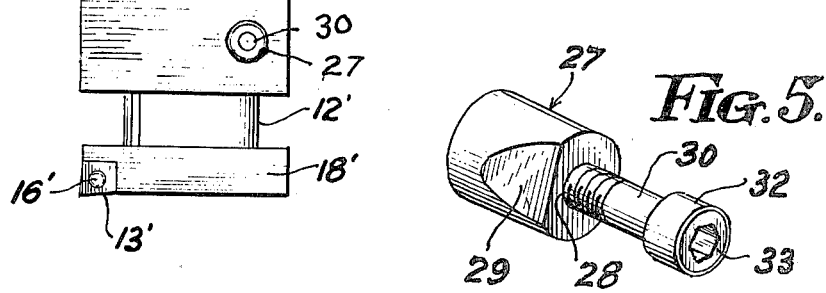

BLOCK BORING TOOL

REFERENCE TO PRIOR ART

U.S. Pat. No. 3,060,771 shows a block-type tool with throw-away inserts of the general type disclosed herein.

There are certain manufacturing companies that have tool holders that are adjustable relative to the block, but none of these are simple in construction and rigid and versatile as applicant's is.

OBJECTS OF THE INVENTION

It is an object of the invention to provide an improved tool holder.

Another object of the invention is to provide a tool holder that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF DRAWINGS

FIG. 1 is a side view of a tool holder and tang according to the invention.

FIG. 2 is an end view of the tang and tool holder showing the tool block partly in cross section for better understanding thereof.

FIG. 3 is a cross-sectional view taken on line 3—3 of FIG. 2.

FIG. 4 is a cross sectional view taken on line 4—4 of FIG. 2.

FIG. 5 is an enlarged view of the locking clamp.

DETAILED DESCRIPTION OF DRAWINGS

Now with more particular reference to the drawings, the block 11 may be supported on a boring bar 10 of a conventional type having a radial slot for receiving the block 11 carrying, in the present instance, a single indexable throw-away tip or insert 13, carried on the tang 12 so that the latter presents a single cutting edge for boring. This set up is similar to that shown in U.S. Pat. No. 3,060,771 wherein the tip or cutting tool 13 is supported on the block. The cutting tool is indicated as a square configuration which presents four different cutting edges which may be indexed by loosening the clamping screw 16 that passes through a hole in the center of the cutting tip, holding the cutting tip in the pocket in the tool support 18 which is integrally attached to the tang 12.

The tang 12 and the tool support end 18 have a threaded hole 19 that is counterbored at 20 to receive the head of a jack screw 21. The head of the jack screw may be of the Allen type that is familiar to those skilled in the art. The block 11 has a blind bore 15 that is complementary in shape to the shape of the tang 12 and the end of the jack screw 21 engages the bottom 22 of the jack screw for adjusting the position of the tang relative to the block 11.

The tang 14 has a lower arcuate shaped edge 23 and an upper flat edge 24 and two flat parallel sides 25 and 26. The flat edge 24 is inclined at very small angles, for example 2 to 4 degrees to the sides 25 and 26 of the tang. The loser edge 23 may be arcuate in shape for example, an arc having a diameter equal to the thickness of the tang.

The cam locking member 27 in the form of a cylinder with a central threaded bore 28 that receives the threaded end of a locking screw 30 which extends through a counterbored hole 31 in a side of the block and receives the head 32 with an Allen type wrench hole 33. The locking cam 27 is received in a hole 31 in the side 25 and causes the inclined surface 29 on the cylinder to slide along the surface 24 on the tang thereby crowding the tang 14 to the opposite side of the bore 15 locking it in position. When the tang 14 is inserted in the bore 15, and screw 30 tightened in the threaded hole 34, the wedge cylinder 27 is tightened to bring the surface 29 firmly against the surface 24 on the tang, the tang 12 will be locked in position relative to the block 11. The jack screw 21 can then be tightened to jack the tang outward from the block 11 to adjust the position of the tip 13 relative to bar block 11.

The wedge cylinder 27 is generally cylindrical in shape and has a central axial threaded hole which receives the threaded end of screw 30. The inclined flat surface 29 may be disposed at for example 2 to 4 degrees to the axis of the cylinder.

The head 32 of screw 21 is received in counterbore 32 in block 11. The screw 30 extends through hole 33 into cylindrical bore 34 and is threadably received in threaded hole 28 in cam member 27.

The foregoing specification sets forth the invention in its preferred practical forms but the structure shown is capable of modification within a range of equivalents without departing from the invention which is to be understood is broadly novel as is commensurate with the appended claims.

I claim:

1. A holder for a cutting tool bit comprising
   an elongated block adapted to be supported on a boring bar,
   an elongated tang,
   cutting tool means on said tang,
   said tang being generally rectangular in cross section,
   a bore in said block defined by at least two side surfaces and at least one edge surface enclosing a space
   generally complementary in shape to said tang,
   said tang being received in said bore and having at least two side surfaces and at least one edge surface parallel to and slideably engaging said side surfaces and edge surface respectively defining said bore in said block,
   wedge means on said block engaging a flat surface adjacent said side surface and edge surface on said tang for clamping said tang in said block in selected positions relative to said block.

2. The holder recited in claim 1 wherein one said edge is arcuate in shape.

3. The holder recited in claim 1 wherein one said edge is generally flat and disposed at an acute angle to said sides,
   said wedge means comprises a clamp member having a flat surface thereon,
   disposed at an acute angle to said sides,
   and threaded means engaging said clamp member urging said clamp member toward said tang whereby said tang is rigidly clamped in said bore.

4. The holder recited in claim 3 wherein said clamp member comprises a generally cylindrical member having a threaded opening therein, and a generally cylindrical surface, said flat surface being generally tangential to said cylindrical surface and inclined toward one end and toward the central axis of said cylindrical member, and a headed, threaded member extending through said cylindrical member and threadably engaging said body whereby said clamping member is urged into engagement with said inclined edge surface on said tang.

5. The holder recited in claim 4 wherein a boring bar is provided.

said boring bar has an opening receiving said block.

6. The holder recited in claim 5 wherein said block has a blind bore on each opposite end of said first mentioned bore, said blind bore in each end each being adapted to receive a said tang.

7. The holder recited in claim 6 wherein said tang has a thickness equal to approximately twice the thickness of the side walls of said block.

8. The holder recited in claim 7 wherein said tang is approximately equal in length to half of the width of its said sides.

9. The holder recited in claim 8 wherein said tang has a thickness of approximately one-third to two-thirds of the thickness of said block.

10. The holder recited in claim 1 wherein said cutting tool means comprises an integral end member on said tang, said integral end member being rectangular in shape and substantially the same width and thickness as the said block.

11. A holder for a cutting tool bit comprising an elongated block, an elongated tang, cutting tool means on said tang, said tang being generally rectangular in cross section, a bore in said block, said bore being generally complementary in shape to said tang, said tang being received in said bore, wedge means on said block engaging said tang for holding said tang in rigid clamped relation in said bore, a jack screw slidably received in said tang and extending therein parallel to said sides, said bore being a blind bore having a bottom and said jack screw extending entirely through said tang engaging said bottom of said bore for moving said tang in relation to said holder.

12. The holder recited in claim 1 wherein a second said tang is supported in a second said bore in the opposite end of said block, and cutting tool means on said second tang.

whereby said cutting tool means can be adjusted in a work piece bore to simultaneously cut on the inside of the said bore in said work piece.

* * * * *